United States Patent
Hölzl et al.

(10) Patent No.: US 12,140,263 B2
(45) Date of Patent: Nov. 12, 2024

(54) TRANSITION COMPONENT HAVING INSULATION

(71) Applicant: Linde GmbH, Pullach (DE)

(72) Inventors: Reinhold Hölzl, Geretsried (DE); Manfred Schönberger, Tacherting (DE); Thomas Englert, Gilching (DE)

(73) Assignee: Linde GmbH, Pullach (DE)

( * ) Notice: Subject to any disclaimer, the term of this patent is extended or adjusted under 35 U.S.C. 154(b) by 239 days.

(21) Appl. No.: 17/597,286

(22) PCT Filed: Nov. 12, 2020

(86) PCT No.: PCT/EP2020/025508
§ 371 (c)(1),
(2) Date: Dec. 30, 2021

(87) PCT Pub. No.: WO2021/093993
PCT Pub. Date: May 20, 2021

(65) Prior Publication Data
US 2022/0316646 A1    Oct. 6, 2022

(30) Foreign Application Priority Data
Nov. 15, 2019 (EP) ..................... 19020641

(51) Int. Cl.
*F16L 59/18* (2006.01)
*F28D 9/00* (2006.01)
(Continued)

(52) U.S. Cl.
CPC ............ *F16L 59/18* (2013.01); *F28D 9/0006* (2013.01); *F28F 9/0248* (2013.01); *F28F 9/0256* (2013.01); *F28F 21/081* (2013.01)

(58) Field of Classification Search
CPC ..... F28D 9/0006; F28F 9/0248; F28F 9/0256; F28F 21/081; F16L 59/18; F16L 59/181; F16L 59/182; F16L 59/184
See application file for complete search history.

(56) References Cited

U.S. PATENT DOCUMENTS

| 903,316 A | * | 11/1908 | Reimann | ............. F16L 27/0824 |
| | | | | 285/47 |
| 3,495,319 A | * | 2/1970 | Finnegan | ............... B23K 20/04 |
| | | | | 428/653 |

(Continued)

FOREIGN PATENT DOCUMENTS

| DE | 102011013340 A1 | 7/2012 |
| DE | 102012011328 A1 | 12/2013 |

(Continued)

*Primary Examiner* — David Bochna
(74) *Attorney, Agent, or Firm* — Millen, White, Zelano & Branigan, P.C.; Brion P. Heaney

(57) ABSTRACT

A transition component for connecting components of a chemical or process engineering plant, wherein the transition component has a first material piece made from a first material and second material piece made from a second material, wherein the first material and the second material cannot be connected to each other by fusion welding, the first material piece and the second material piece forming a hollow body, the transition component having a radially interior inner side and a radially exterior outer side, the first material piece being connected to the second material piece by at least one intermediate material layer and the transition component having at least one insulation layer, wherein the insulation layer extends at least in part over the inner side and/or the outer side of the transition component, and a core-in-shell heat exchanger and a cold box having the transition component.

21 Claims, 4 Drawing Sheets

(51) Int. Cl.
*F28F 9/02* (2006.01)
*F28F 21/08* (2006.01)

(56) References Cited

U.S. PATENT DOCUMENTS

| | | | | |
|---|---|---|---|---|
| 3,602,978 | A * | 9/1971 | Oaks | B23K 20/2275 228/159 |
| 3,610,330 | A * | 10/1971 | Nasser | F28F 9/0221 165/158 |
| 3,632,143 | A * | 1/1972 | Lessmann | F16L 19/0212 403/29 |
| 3,747,961 | A | 7/1973 | Couch et al. | |
| 3,899,007 | A | 8/1975 | Miller | |
| 3,907,049 | A * | 9/1975 | Baffas | B29C 63/26 285/55 |
| 4,015,745 | A * | 4/1977 | Petrangelo | H02B 1/28 174/521 |
| 4,084,842 | A * | 4/1978 | Stonitsch | F16L 59/18 285/123.17 |
| 4,219,080 | A * | 8/1980 | Chaix | F28D 9/0006 165/145 |
| 4,295,669 | A * | 10/1981 | LaPrade | F16L 59/184 285/47 |
| 4,349,203 | A * | 9/1982 | Schulke | F16L 23/12 285/911 |
| 4,421,325 | A * | 12/1983 | Napolitano | F16J 15/0887 277/626 |
| 4,552,386 | A * | 11/1985 | Burchette | F16L 23/24 285/414 |
| 6,227,575 | B1 * | 5/2001 | Monning | F16L 53/00 285/368 |
| 2004/0216784 | A1 * | 11/2004 | Corbett, Jr. | F24D 3/1058 137/599.11 |
| 2007/0007767 | A1 * | 1/2007 | Howard | F16L 25/0072 285/368 |
| 2008/0202738 | A1 * | 8/2008 | Nelson | F28F 21/08 165/174 |

FOREIGN PATENT DOCUMENTS

| | | |
|---|---|---|
| EP | 3077750 A1 | 10/2016 |
| EP | 3143352 A1 | 3/2017 |
| EP | 3237825 A1 | 11/2017 |
| FR | 2750483 A1 | 1/1998 |
| FR | 2947032 A1 | 12/2010 |
| WO | 2015042721 A1 | 4/2015 |
| WO | 2016/000812 A1 | 1/2016 |
| WO | 2016/102045 A1 | 6/2016 |
| WO | 2016/102046 A1 | 6/2016 |

* cited by examiner

TRANSITION COMPONENT HAVING INSULATION

The invention relates to a transition component for connecting components of a chemical or process engineering apparatus, wherein the transition component has a first material piece made from a first material and a second material piece made from a second material, wherein the first material and the second material cannot be connected to each other by fusion welding, wherein the first material piece and the second material piece form a hollow body, wherein the transition component has a radially interior inner side and a radially exterior outer side, and wherein the first material piece is connected to the second material piece by at least one intermediate material layer. The invention further relates to a core-in-shell heat exchanger having the transition component and to a cold box with piping having the transition component.

PRIOR ART

In numerous applications—in particular, cryogenic plants, e.g., cryogenic heat exchangers for liquefying gases or a cold box for providing, for example, a liquefied cryogenic gas, or in the case of core-in-shell heat exchangers or cryogenic containers or cryogenic pumps—in order to provide fluid-tightness, for example, it is necessary to connect—in particular, weld-components, such as pipes—in particular, of different materials—to each other. The aforementioned plants or devices are examples of or components of the aforementioned chemical or process engineering apparatuses.

For example, to connect an aluminum pipe to a steel pipe, a transition component (transition joint) is used which has an aluminum segment to which the aluminum pipe can be fastened—in particular, welded—and a steel segment to which the steel pipe can be fastened—in particular, welded. In order to connect the aluminum section of the transition component to the steel section of the transition component in a fluid-tight manner, various intermediate material layers made of metal, e.g., of titanium or of a titanium alloy, of copper, of nickel, or of a copper-nickel alloy, are arranged between the aluminum section and the steel section in several steps by means of explosive cladding. On the one hand, such a production method is very complex. On the other hand, the intermediate material layers made from metal are physically highly stressed by the explosive cladding, whereby the intermediate material layers can become brittle or fragile.

Other types of connecting pieces or structures are also known from the prior art:

U.S. Pat. Nos. 3,899,007 A and 3,747,961 A each describe a pipe arrangement with an internal, high-temperature-resistant central pipe, which is held in a coaxial housing pipe in order to protect against axial or longitudinal movements by an armature or an armature plate. The armature is guided out of such housing and lies on the outside in an insulation layer—for example, made from concrete. The central pipe is in turn surrounded by an insulating ring layer. FR 2 947 032 A1 proposes connecting two lines via a flange or connecting structure. Each of the two lines has an inner wall and an enveloping wall, wherein the inner wall is guided outwards at the end of the line. The connecting structure also has an inner side and an outer side, wherein, when the two lines are connected, the inside wall sections at the line ends come to rest on the inner side of the connecting structure.

The aim of the present invention is to provide a transition component that is easier to produce and has advantageous properties compared to known transition components.

DISCLOSURE OF THE INVENTION

According to the invention, a transition component and a core-in-shell heat exchanger as well as a cold box having the features of the independent claims are proposed. Advantageous embodiments are the subject matter of the dependent claims and the following description.

The transition component according to the invention for connecting components of a chemical or process engineering apparatus—in particular, in a cryogenic plant—has a first material piece made from a first material and a second material piece made from a second material, wherein the first material and the second material cannot be connected to each other by fusion welding.

The transition component or the first material piece and the second material piece have a shape of a hollow body—in particular, a toroidal shape, annular shape, or circular cylinder shape—with a radially interior inner side and a radially exterior outer side. The transition component is suitable for being connected to pipes of the chemical or process engineering apparatus, wherein the shape of the transition component is preferably adapted to the shape of the pipes.

The first material piece is connected to the second material piece by at least one intermediate material layer—in particular, made from metal. The at least one intermediate material layer is arranged—in particular, by means of explosive cladding—between the first material piece and the second material piece or is applied to the first and/or second material piece.

The transition component from the prior art is subjected to high thermal stresses. For example, if cryogenic fluid flows through the transition component, the inner side of the transition component will be cooled quickly and significantly, as a result of which the temperature of the inner side changes relative to the temperature of the outer side of the transition component. Due to this temperature difference and the different coefficients of thermal expansion of the individual materials, stresses are generated in the transition component between the inner side and the outer side and/or between the individual materials, which may, for example, lead to cracks or breaks.

Such a temperature difference between the inner side and the outer side affects, for example, the at least one intermediate material layer in such a way that the at least one intermediate material layer wants to contract more strongly on the inner side than on the outer side. Thus, stresses also arise in the at least one intermediate material layer.

Such stresses lead, for example, to the at least one intermediate material layer stressed by the explosive cladding being subjected to further stresses, whereby cracks or breaks may form in the intermediate material layer. Furthermore, such cracks or breaks may, for example, lead to the transition component becoming not tightly sealed and thus to cryogenic fluid being able to escape. Such a disadvantage does not occur in the transition component proposed according to the invention.

The transition component according to the invention has at least one insulation layer. The insulation layer extends at least partially over the inner side and/or the outer side of the transition component.

Here, "partially" means, for example, that the insulation layer is arranged only above the at least one intermediate material layer. Furthermore, the insulation layer can also be arranged over the at least one intermediate material layer and over at least a portion of the first material piece and/or over at least a portion of the second material piece.

If the at least one insulation layer is arranged on the inner side of the transition component, it insulates the transition component at least partially from the cryogenic fluid. The temperature difference between the inner side and the outer side of the transition component is thereby reduced. This results in fewer stresses arising in the transition component. If the at least one insulation layer is arranged on the outer side of the transition component, it insulates the transition component at least partially from the temperature of the environment, e.g., the temperature of the air, whereby the temperature difference between the inner side and the outer side of the transition component is reduced.

In general, the at least one insulation layer thus increases the service life of the transition component.

For example, if one insulation layer is arranged in each case on the inner side and the outer side of the transition component, the temperature difference can additionally be reduced, and the service life of the transition component extended.

The at least one insulation layer is preferably arranged in such a way that it covers the first material piece, the at least one intermediate material layer, and the second material piece. By means of such an arrangement, the first material piece, the at least one intermediate material layer, and the second material piece have approximately the same temperature. In this way, it is prevented that, for example, due to a significant temperature difference between the first material piece and the at least one intermediate material layer, stresses can occur between the two components, which, for example, can damage or destroy the first material piece and/or the at least one intermediate material layer.

The insulation layer arranged on the outer side of the transition component is preferably a sheath. The sheath is designed as a hollow body and is toroidal, annular, or circular cylindrical in form. The insulation layer in the shape of a sheath is attached to the transition component and encases or encloses it. The sheath can be adapted and selected accordingly depending upon the location of use and the specific use of the transition component.

If the first material piece is connected to a first piping made from the first material, and the second material piece is connected to a second piping made from the second material, the sheath preferably covers a section of the first piping and/or a section of the second piping. In the sense outlined herein, a "piping" can, in particular, represent a section of a line to or from a heat exchanger.

For example, the first material piece is connected—in particular, welded—to the first piping. If the sheath covers only the transition component, such as in a transition piece from the prior art, for example, a temperature difference between the first material piece and the first piping could cause stresses to arise between the first material piece and the first piping. This could lead, for example, to the weld seam being damaged, as a result of which cryogenic fluid could escape.

For example, if the sheath extends over the region in which the first material piece is connected to the first piping, the stresses between the first material piece and the first piping are reduced compared to the prior art, thereby protecting the connection.

The sheath preferably features metal and/or plastic and/or ceramic and/or concrete. The sheath can be designed in various embodiments. In one embodiment, the sheath could be provided in the shape of a pipe—in particular, in the shape of a thermal protective pipe. The pipe surrounds the transition component and/or the piping connected thereto, wherein the pipe can be fastened to the transition component and/or the piping connected thereto in a firmly-bonded manner (for example, by means of welding) or in a positive-locking manner (by means of screws).

In an alternative embodiment, the sheath can take the shape of plastic mats, wherein the plastic mats are laid around the transition component and/or the associated piping. Collars, for example, here serve as fastening means.

In a further alternative, the sheath can take the shape of a structure with cavities made from plastic, wherein the structure has, for example, hexagonal, rectangular, or round cavities, which are filled with gases or feature a vacuum.

Furthermore, insulating foam and/or styrene may also be used as a sheath.

The insulation layer, which is arranged on the inner side of the transition component, is preferably a refractory lining. The refractory lining is designed as a hollow body and is toroidal, annular, or circular cylindrical in form. Furthermore, the refractory lining is connected to the transition component in a positive-locking manner, e.g., by means of screws, and/or a firmly-bonded manner, e.g., glued, so that cryogenic fluid flowing through the transition component is not able to displace or remove the refractory lining. Furthermore, the refractory lining is connected to the transition component in such a way that cryogenic fluid cannot pass between the refractory lining and the transition component. This could, for example, loosen or release the connection between the refractory lining and the transition component. Furthermore, a cryogenic fluid between the transition component and the refractory lining would counteract the insulation of the transition component.

The refractory lining preferably features an aluminum oxide ceramic, concrete, a structure with cavities made from plastic, insulating foam, and/or styrene, or a mixture thereof. Concrete or insulating foam may, for example, be brought or poured into the shape of a refractory lining. An aluminum oxide ceramic can, for example, be produced in such a way that it has the shape of the refractory lining. It goes without saying that, depending upon the application, a material for the refractory lining may be preferred by a person skilled in the art.

Furthermore, with the transition component according to the invention, the first material is steel or stainless steel, and the second material is aluminum or an aluminum alloy. Particularly in cryogenic plants, e.g., cryogenic heat exchangers for liquefying gases, or cryogenic containers or cryopumps, steel pipes and aluminum pipes are frequently used. Aluminum and steel (or their alloys) cannot be welded. The transition component is thus suitable for creating a transition between a steel pipe and an aluminum pipe, wherein the connection is designed to be fluid-tight.

The at least one intermediate material layer is preferably a silver layer, a nickel layer, or a nickel-titanium layer. Such materials can be connected by means of explosive cladding to the first material piece and/or the second material piece, whereby it is possible to connect the first material piece to the second material piece. A connection created in this way is fluid-tight so that, for example, cryogenic fluid cannot escape. Furthermore, the connection between the first material piece and the second material piece cannot be released. It goes without saying that the number and the material used can be selected and varied according to the application of the transition component. If several intermediate material layers are selected, one or more silver layers, nickel layers, and/or nickel-titanium layers can be used, for example, as intermediate material layers.

The core-in-shell heat exchanger according to the invention has a plate heat exchanger arranged in an outer container of the core-in-shell heat exchanger. The plate heat exchanger is provided with a supply line via which fluid can be introduced into the plate heat exchanger and with a discharge line via which fluid can be removed from the plate heat exchanger. Furthermore, at least one transition component according to the invention is arranged in the supply line and/or in the discharge line of the plate heat exchanger.

In a core-in-shell heat exchanger (also referred to as a block-in-shell, block-in-kettle, or plate-and-shell heat exchanger; the terms are synonymous), at least one plate heat exchanger, the so-called "core," is arranged in an outer container, also called "shell."

The core-in-shell heat exchanger serves to realize an indirect heat transfer of, for example, a gaseous fluid to a liquid fluid. The gaseous fluid is introduced, for example, from the outside via the first supply line into the plate heat exchanger, while the liquid fluid is provided in the outer container in such a way that the liquid fluid surrounds the plate heat exchanger. The indirect heat contact takes place at the plates of the plate heat exchanger, wherein the gaseous fluid is cooled and liquefied, and the liquid fluid is at least partially transferred into the gaseous aggregate state. However, core-in-shell heat exchangers are also suitable for other types of heat transfer.

The use of a core-in-shell heat exchanger is advantageous compared with tube bundle heat exchangers, e.g., due to the curves in the Q-T diagram better approximating each other, the lower size, and the lower weight, along with the lower production and operating costs. A core-in-shell heat exchanger is described in, for example, K. Thulukkanam, Heat Exchanger Design Handbook, 2nd edition, CRC Press 2013, on page 127 and illustrated in FIG. 4.25. Core-in-shell heat exchangers are disclosed in, for example, EP 3 237 825 A1, WO 2016/102046 A1, WO 2016/102045 A1, WO 2016/000812 A1, EP 3 143 352 A1, EP 3 077 750 A1, DE 10 2012 011328 A1, and DE 10 2011 013 340 A1.

The plate heat exchanger is formed at least partially from the aforementioned second material, which cannot be welded to a first material typically used for the predominant portion of the pipeline. Therefore, the supply line and/or the discharge line advantageously has a first piping made from the first material and a second piping made from the second material, wherein the first material and the second material cannot be connected by fusion welding. The second piping is connected, on the one hand, to the plate heat exchanger and, on the other, to the transition component according to the invention, wherein the transition component serves to connect the first piping to the second piping.

Since the second piping and the plate heat exchanger are formed from the same material, they can be connected to each other—for example, by welding. This connection is fluid-tight and ensures that the fluid, which is to be conducted into the plate heat exchanger, enters the plate heat exchanger and does not flow beforehand into the outer container of the core-in-shell heat exchanger. Furthermore, the transition component also ensures that the connection between first piping and second piping is fluid-tight.

Here as well, the first material is steel or stainless steel, and the second material is aluminum or an aluminum alloy. The plate heat exchanger is thus formed, in particular, from aluminum. This is advantageous, since aluminum has a high degree of thermal conductivity, and thus the heat can conduct well between the two fluids. Furthermore, the plate heat exchanger can be easily produced—for example, by brazing.

The cold box according to the invention has a piping containing at least one transition component according to the invention.

Cold boxes are temperature-insulating enclosures in which process engineering apparatuses operated at low—in particular, cryogenic temperatures—are installed. A process engineering plant can comprise one or more corresponding cold boxes and can, in particular, be produced modularly from corresponding cold boxes. Process engineering plants equipped with cold boxes are, for example, plants for air separation or plants for separating synthesis gas into its components, hydrogen, nitrogen, and carbon monoxide. Temperatures of −180° C. and less are achieved In such processes. The invention is suitable for all fields of application of cold boxes and is not limited to these examples. In a cold box, several plant parts, i.e., for example, separating apparatuses such as columns and the associated heat exchangers, can also be fastened together with the piping to a supporting steel frame, which is covered on the outside with sheet-metal plates. The interior of the enclosure formed in this way is filled with insulating material, such as perlite, in order to prevent heat input from the environment. A partial or complete prefabrication of cold boxes with the corresponding apparatuses at the factory is also possible, so that they have to be finished at the construction site or only connected to each other as needed. For connection, line modules that are temperature-isolated and, possibly, accommodated in cold boxes can be used. In typical cold boxes, the plant parts are usually installed at a minimum distance from the wall, in order to ensure sufficient insulation.

The piping in a cold box according to the invention is preferably designed without flange connections, i.e., completely welded or via at least one transition component according to the invention, in order to avoid the formation of leaks. Due to the temperature differences that arise, expansion bends can be present in the piping. Components susceptible to maintenance are typically not arranged in the cold box, so that the interior of the cold box is, advantageously, maintenance-free. Valves can be designed, for example, as so-called "corner valves" in order to enable repair from outside. In this case, the valve is located in the cold box wall; the pipeline is guided to the valve and back again. Pipelines and apparatuses are normally made of aluminum; stainless steel is also used at very high operating pressures. The transition component according to the invention makes it possible to connect such materials. The painting of the cold box is quite often in white, but also in other bright colors. The penetration of moisture from the ambient air, which would freeze at the cold plant parts, can be prevented by a continuous flushing of the cold box with, for example, nitrogen.

Further advantages and embodiments of the invention arise from the description and the accompanying drawings.

It is to be understood that the features mentioned above and below may be used not only in the particular combination specified, but also in other combinations or by themselves, without departing from the scope of the present invention.

The invention is schematically illustrated in the drawings using exemplary embodiments and is described in the following with reference to the drawings.

DESCRIPTION OF THE FIGURES

Identical reference signs in the figures denote identical or structurally-identical elements, and are not described separately each time.

In FIG. 1, a preferred embodiment of a transition component according to the invention with a sheath in a longitudinal sectional view is shown and denoted by 1a.

Figure 1:
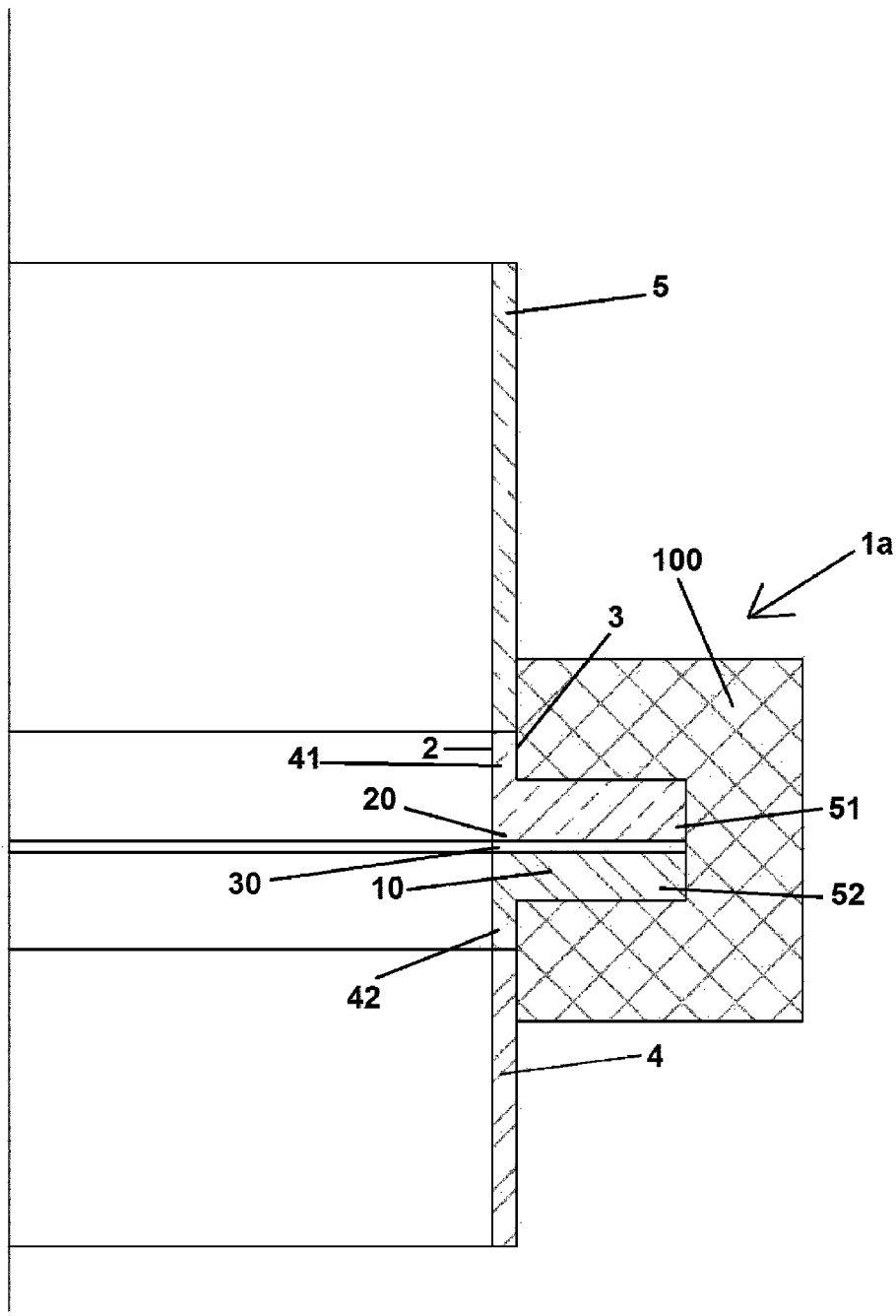
FIG. 1 schematically shows a preferred embodiment of a transition component according to the invention with a sheath in a longitudinal sectional view.

The transition component 1a has a first material piece 10, a second material piece 20, and an intermediate material layer 30. The transition component 1a or the first material piece 10, the intermediate material layer 30, and the second material piece 20 have a hollow cylinder shape with a radially interior inner side 2 and a radially exterior outer side 3. The first material piece 10 consists of steel, the intermediate material layer 30 of nickel, and the second material piece 20 of aluminum, wherein the first material piece 10 cannot be connected to the second material piece 20 by fusion welding. The first material piece 10 is connected—in particular, welded—to a steel pipe 4, and the second material piece 20 is connected—in particular, welded—to an aluminum pipe 5.

The first material piece 10 and the second material piece 20 each have a thin section 41, 42 and a thick section 51, 52, wherein the thick section 51, 52 has a thickness that is about two to five times thicker than a thickness of the thin section 41, 42.

The intermediate material layer 30 is arranged between the thick section 51 of the first material piece 10 and the thick section 52 of the second material piece 20. The intermediate material layer 30 was connected to the second material piece 20 by means of explosive cladding. The intermediate material layer 30 was subsequently connected to the first material piece 10. This connection was formed here by means of explosive cladding. Here, the thick sections 51, 52 serve in particular to provide a sufficient surface to which the intermediate material layer 30 can be applied. Thus, the intermediate material layer 30 serves here to connect the first material piece 10 to the second material piece 20. A connection created in this way is fluid-tight so that, for example, cryogenic fluid cannot escape. Furthermore, the connection between the first material piece 10 and the second material piece 20 cannot be released.

However, the intermediate material layer 30 is physically highly stressed by the explosive cladding, whereby the intermediate material layer 30 can become brittle or fragile.

In particular, in the case of cryogenic plants in which cryogenic fluid flows through the transition component 1a, the cryogenic fluid cools the claimed transition component 1a from the inner side 2 to the outer side 3. Thus, the intermediate material layer 30 is also cooled, and contracts by cooling. Such additional forces can cause the brittle, intermediate material layer to be damaged or destroyed, causing the transition component 1a to leak. The greater the temperature difference between the inner side 2 and the outer side 3 of the transition component 1a, the greater the forces acting on the intermediate material layer.

In order to reduce the temperature difference between the inner side 2 and the outer side 3 of the transition component 1a, the transition component 1a also has insulation in the shape of a sheath 100—in particular, a thermal protection pipe. The sheath 100 is designed as a hollow body and is toroidal, annular, or circular cylindrical in form. The sheath 100 is arranged on the radially outward outer side 3 in such a way that it encloses the transition component 1a. As a result of such an arrangement, the first material piece 10, the intermediate material layer 30, and the second material piece 20 have approximately the same temperature. The temperature difference between the inner side 2 and the outer side 3 of the intermediate material layer 30 is thus reduced, whereby the stresses arising in the intermediate material layer 30 are reduced.

Furthermore, stresses arising, for example, between the first material piece 10 and the intermediate material layer 30, which can damage or destroy, for example, the first material piece 10 and/or the intermediate material layer 30, are reduced. Thus, the sheath 100 increases the service life of the transition component 1a.

Furthermore, the sheath 100 extends at least partially over the steel pipe 4 and the aluminum pipe 5. This is advantageous, since a temperature difference between the first material piece 10 and the steel pipe 4 could cause stresses to arise between the first material piece 10 and the steel pipe 4. This could, for example, result in the weld seam between the first material piece 10 and the steel pipe 4 being damaged.

Figure 2:
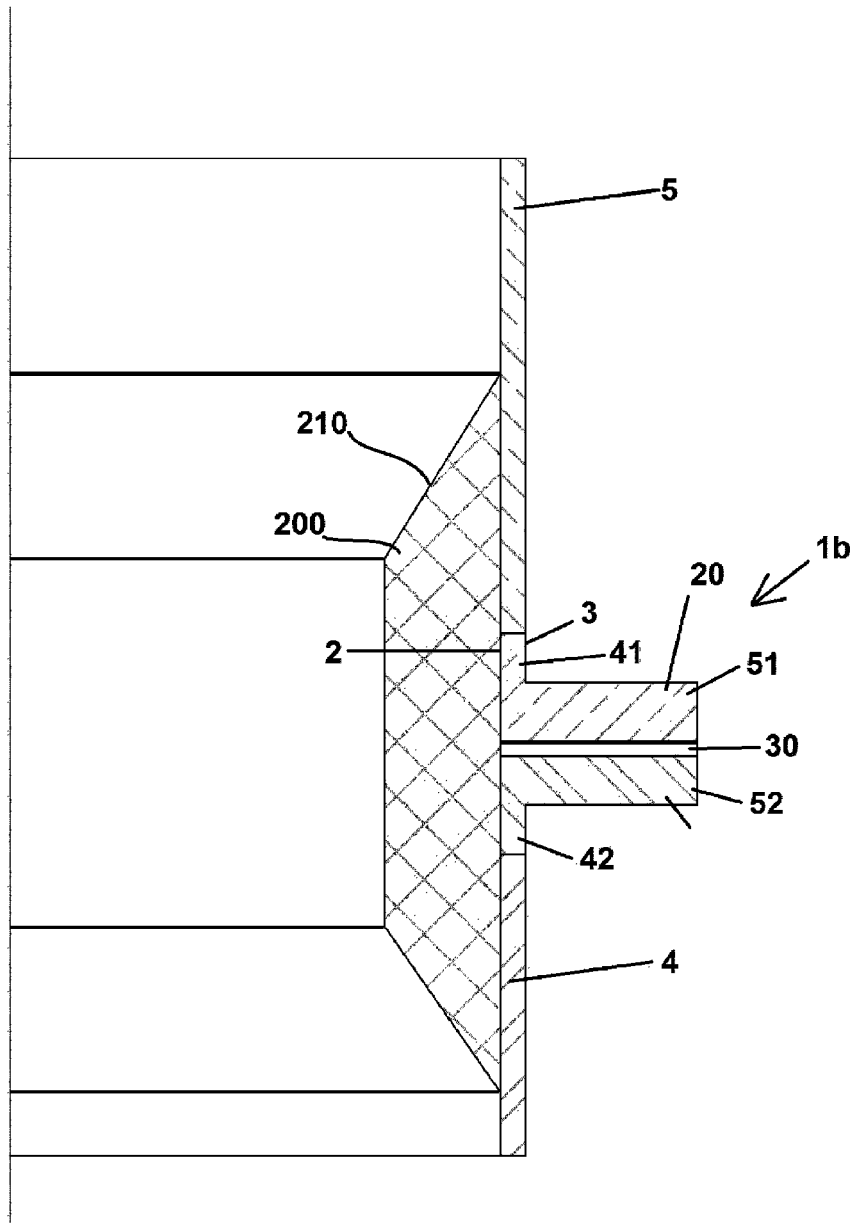
FIG. 2 schematically shows a preferred embodiment of a transition component according to the invention with a refractory lining in a longitudinal sectional view.

FIG. 2 shows a further preferred embodiment of a transition component 1b according to the invention with a refractory lining in a longitudinal sectional view.

The transition component 1b differs from the transition component 1a from FIG. 1 in that the transition component 1b has insulation in the shape of a refractory lining 200. The refractory lining 200 is designed as a hollow body and is toroidal, annular, or circular cylindrical in form, and is, for example, an aluminum oxide ceramic.

The refractory lining 200 is arranged on the radially interior inner side 3, such that it covers the transition component 1b. As a result of such an arrangement, the first material piece 10, the intermediate material layer 30, and the second material piece 20 have approximately the same temperature. The temperature difference between the inner side 2 and the outer side 3 of the intermediate material layer 30 is thus reduced, whereby the stresses arising in the intermediate material layer 30 are reduced.

Furthermore, stresses arising, for example, between the first material piece 10 and the intermediate material layer 30, which can damage or destroy, for example, the first material piece 10 and/or the intermediate material layer 30, are reduced. Thus, the refractory lining 200 increases the service life of the transition component 1b.

Furthermore, the refractory lining 200 extends at least partially over the steel pipe 4 and the aluminum pipe 5. This is advantageous, since a temperature difference between the first material piece 10 and the steel pipe 4 could cause stresses to arise between the first material piece 10 and the steel pipe 4. This could, for example, result in the weld seam between the first material piece 10 and the steel pipe 4 being damaged.

The refractory lining 200 has a trapezoidal cross-section, wherein the edges 210 of the refractory lining 200 extending radially from inside to outside are inclined or flattened. As a result, the cryogenic fluid can flow through the transition component 1b without the refractory lining 200 significantly increasing the flow resistance, as would be the case, for example, with edges extending vertically.

Here, the refractory lining 200 is connected in a positive-locking manner to the transition component—in particular, screwed thereto—so that cryogenic fluid flowing through the transition component 1b is not able to displace or remove the refractory lining 200. Furthermore, the refractory lining 200 is connected to the transition component 1b in such a way that cryogenic fluid cannot pass between the refractory lining 200 and the transition component 1b. This could, for example, loosen or release the connection between the refractory lining 200 and the transition component 1b. Furthermore, a cryogenic fluid between the transition component 1b and the refractory lining 200 would counteract the insulation of the transition component 1b.

Figure 3:
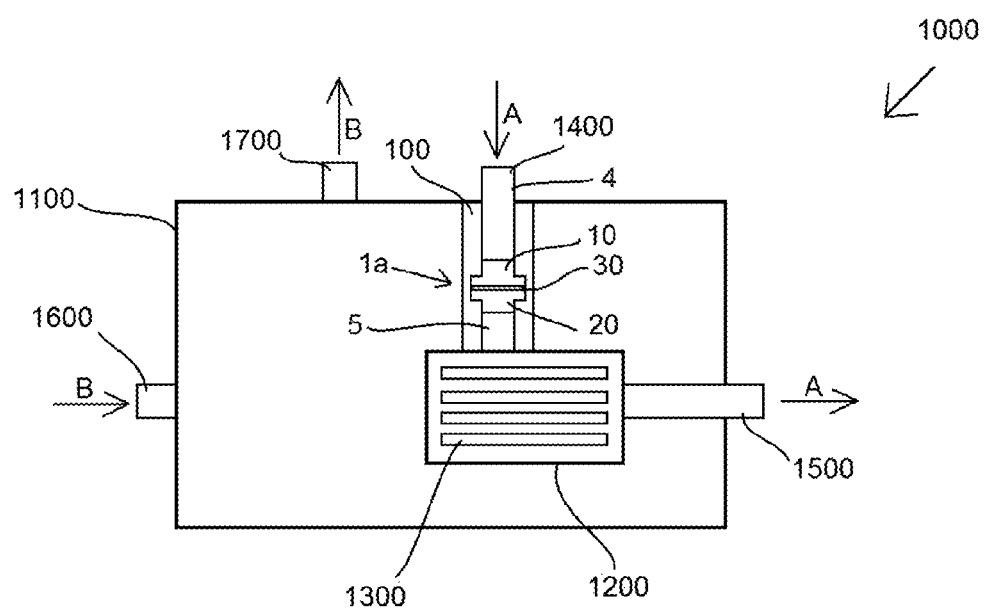
FIG. 3 schematically shows a preferred embodiment of a core-in-shell heat exchanger.

FIG. 3 schematically shows a preferred embodiment of a core-in-shell heat exchanger 1000. The core-in-shell heat exchanger 1000 has an outer container 1100 (shell) and a plate heat exchanger 1200 arranged in the outer container 1100.

The plate heat exchanger 1200 has a plurality of plates 1300. The plate heat exchanger 1200 and the plates 1300 are brazed, for example, from aluminum.

The plates 1300 are configured to transfer a heat from a fluid A, e.g., natural gas, to a fluid B, e.g., a refrigerant (for example, a mixture of ethylene and propylene). For this purpose, fluid A, which is present in the gaseous state, can be guided from the outside into the core-in-shell heat exchanger 1000 or into the plate heat exchanger 1200 via a first supply line 1400, i.e., the fluid A flows through the plates 1300 of the plate heat exchanger. The fluid A is cooled there, and can be discharged or removed as a liquid from the plate heat exchanger 1200 and from the core-in-shell heat exchanger 1000 via a first discharge line 1500 featuring aluminum.

The heat of fluid A is transferred at the plates 1300 to the fluid B, which is conducted as a liquid and/or as a gas (a two-phase mixture in this case) into the outer container 1100 of the core-in-shell heat exchanger 1000 via a second supply line 1600. The fluid B flows between the plates 1300 of the plate heat exchanger 1200, and the liquid components of the fluid B are transferred into the gaseous state. The gaseous components of the fluid B are brought to a higher temperature. Subsequently, the gaseous fluid B can be removed from the core-in-shell heat exchanger 1000 via a second discharge line 1700. The second supply line 1600 and the second discharge line 1700 feature steel, for example.

Here, the first supply line 1400 has a steel pipe 4 and an aluminum pipe 5, wherein the aluminum pipe 5 is completely arranged and the steel pipe 4 is partially arranged in the interior of the outer container 1100. The aluminum pipe 5 is welded to the plate heat exchanger 1200. The steel pipe 4 serves, for example, for being connected—in particular, welded—to a steel pipe of a tank, in which the fluid A is present.

Furthermore, the transition component 1a (from FIG. 1) is arranged between the steel pipe 4 and the aluminum pipe 5. The transition component 1a serves to connect the steel pipe 4 to the aluminum pipe 5 in a fluid-tight manner. For this purpose, the transition component 1a has a first material piece 10 that features steel, a second material piece 20 that features aluminum, and an intermediate material layer 30 that features nickel and that is arranged between the first material piece 10 and the second material piece 20 by means of explosive cladding. The first material piece 10 is welded to the steel pipe 4, and the second material piece 20 is welded to the aluminum pipe 5.

In the interior of the first supply line 1400 through which the gaseous fluid A is conducted into the plate heat exchanger 1200, the temperature is higher than the temperature outside the first supply line 1400. Due to this temperature difference and to the different coefficients of thermal expansion of the individual materials, stresses can arise in the transition component 1a and/or in the first supply line 1400 between the inner side and the outer side and/or between the individual materials—for example, at the weld seams. This could, for example, lead to cracks or breaks in the first supply line 1400 or in the individual materials.

In this embodiment, the sheath 100 of the transition component 1a extends over the part of the first supply line 1400 arranged in the interior of the outer container 1100 and thus ensures that the occurrence of stresses is reduced. Furthermore, the gaseous fluid A is thus prevented from escaping through cracks and breaks—for example, at a weld seam.

It goes without saying that the use of the transition component 1a in the first supply line 1400 is only one example here. It is also possible to install additional transition components in or on the core-in-shell heat exchanger 1000. If, for example, the second discharge line 1700, which features steel, is to be connected outside the core-in-shell heat exchanger 1000 to a pipe that does not feature steel, and thus cannot be welded directly to the second discharge line 1700, a corresponding transition component could be used here.

Further, in one case, it may be necessary for the first discharge line 1500 to feature steel, which would prevent a direct connection of the first discharge line 1500 to the plate heat exchanger 1200 from being realized. Thus, the use of an additional transition component would be conceivable here.

The core-in-shell heat exchanger 1000 is also only one example of the application of the transition component. It is also expedient to use transition components in cold box systems, or "cold boxes" for short. Cold box systems are used for air separation or for separating synthesis gas and, for this purpose, have a plurality of heat exchangers and/or cold chambers as process engineering apparatuses through which the air or the synthesis gas flows. Transition components can be attached, for example, to pipes that serve to remove a specific component of the air or of the synthesis gas from the cold box system after separation. Since the individual components are filled and stored, for example, in steel or stainless-steel containers, while the heat exchangers feature, for example, aluminum, the use of transition components is preferred here, since a simple connection of the aluminum piping of the heat exchanger to the piping of the stainless steel container can thereby be created.

Figure 4:
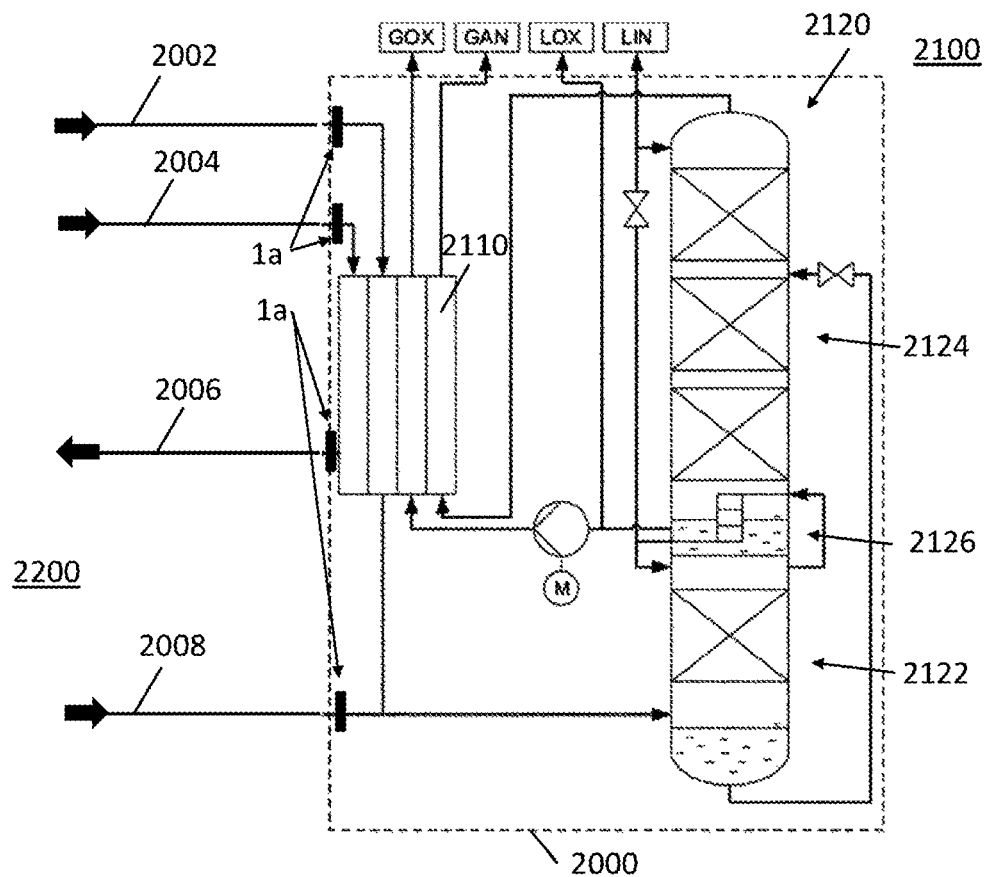
FIG. 4 schematically shows a preferred embodiment of a cold box.

FIG. 4 shows, by way of example, an air separation plant 2100 of a type known per se, the components of which are arranged at least partially in a cold box 2000.

As mentioned, air separation plants of the type shown are often described elsewhere, e.g., in H.-W. Haring (ed.), Industrial Gases Processing, Wiley-VCH, 2006—in particular, Section 2.2.5, "Cryogenic Rectification." For detailed explanations regarding structure and operating principle, reference is therefore made to corresponding technical literature. An air separation plant for use of the present invention can be designed in a wide variety of ways.

The air separation plant 2100 shown as an example in FIG. 4 can have, in a so-called warm part 2200 that is schematically indicated to the left of the cold box 2000 and not illustrated in detail, among other things, a main air compressor, a pre-cooling device, a cleaning system, and a post-compressor assembly. Within the cold box 2000, a main heat exchanger 2110 and a distillation column system 2120 are arranged as process engineering apparatuses. In the example shown, the distillation column system 2120 comprises a traditional double-column arrangement of a high-pressure column 2122 and a low-pressure column 2124, which are connected to each other in a heat exchanging manner via a main condenser 2126.

Pressurized feed air flows are supplied to the cold box 2000 in the direction of the arrow and via lines 2002, 2004, which are connected to the cold box 2000 by means of the transition pieces 1*a*. One of the feed air flows can, after partial cooling in the main heat exchanger 2110 via a line 2006, which is connected to the cold box 2000 via a transition piece 1*a*, be removed, e.g., expanded outside the cold box 2000, and returned to the cold box 2000 via a line 2008, which is connected to the cold box 2000 via a transition piece 1*a*.

The transition components 1*a* connect the outer piping of the cold box 2000 to aluminum piping within the cold box 2000.

An oxygen-enriched, liquid bottom fraction and a nitrogen-enriched, gaseous top fraction are formed in the high-pressure column 2122. The oxygen-enriched, liquid sump fraction is withdrawn from the high-pressure column 2122 and transferred into the low-pressure column 2124. A gaseous, nitrogen-rich top product is withdrawn from the top of the high-pressure column 2122, liquefied in the main condenser 2126 and fed in portions to the high-pressure column 2122 as a reflux, expanded into the low-pressure column 2124, and discharged from the air separation plant 2100 as a liquid product LIN.

An oxygen-rich, liquid bottom fraction and a nitrogen-rich, gaseous top fraction are formed in the low-pressure column 2124. The former is partially pressurized in a liquid state in a pump coupled to a motor M, heated in the main heat exchanger 2110, and provided as gaseous, pressurized product GOX. Any portion not pressurized to liquid in the pump can be discharged from the air separation plant 2100 as the liquid oxygen product LOX. A gaseous, nitrogen-rich stream withdrawn from the top of the low-pressure column 2124 is guided through the main heat exchanger 2110 and provided as the nitrogen product GAN.

It goes without saying that the preferred embodiments according to FIGS. 1 and 2 can also be combined. For example, the transition component can have a sheath 100 and a refractory lining 200. As a result, the temperature difference between the inner side 2 and the outer side 3 of the transition component can, additionally, be reduced, and the service life of the transition component extended. In the plant according to FIG. 3 or FIG. 4, a transition component 1*b*, or both transition components, or transition components different therefrom could also be used as sketched.

The invention claimed is:

1. A transition component for connecting components of a chemical or process engineering apparatus, wherein the transition component comprises:
    a first material piece made from a first material and a second material piece made from a second material, wherein the first material and the second material cannot be connected to each other by fusion welding,
    the first material piece and the second material piece form a hollow body, and the transition component has a radially interior inner side and a radially exterior outer side,
    the first material piece is connected to the second material piece by at least one intermediate material layer, and
    the transition component has at least one insulation layer, wherein the insulation layer is a refractory lining and arranged on the inner side of the transition component and extends at least partially over the inner side of the transition component, and wherein the first material is steel or stainless steel, and the second material is aluminum or an aluminum alloy.

2. The transition component according to claim 1, wherein the at least one insulation layer is arranged in such a way that the at least one insulation layer covers the first material piece, the at least one intermediate material layer, and the second material piece.

3. The transition component according to claim 1, wherein the refractory lining comprises an aluminum oxide ceramic, concrete, a honeycomb structure made from plastic, insulating foam, and/or styrene, or a mixture thereof.

4. The transition component according to claim 1, wherein the at least one intermediate material layer is a metallic layer.

5. The transition component according to claim 1, wherein the at least one intermediate material layer is a silver layer, a nickel layer, or a nickel-titanium layer.

6. The transition component according to claim 1, wherein the transition component comprises a further insulation layer is arranged on the outer side of the transition component wherein said further insulation layer is a sheath.

7. The transition component according to claim 6, wherein
    the first material piece is connected to a first piping made from the first material, and the second material piece is connected to a second piping made from the second material, wherein the sheath further covers a section of the first piping and/or a section of the second piping, and
    wherein the refractory lining comprises an aluminum oxide ceramic, concrete, a honeycomb structure made from plastic, insulating foam, and/or styrene, or a mixture thereof.

8. The transition component according to claim 1, wherein the at least one intermediate material layer is applied to the first and/or second material piece by explosive cladding.

9. The transition component according to claim 1, wherein the first material piece and the second material piece each have a relatively thin section and a relatively thick section, wherein the intermediate material layer is arranged between the thick section of the first material piece and the thick section of the second material piece.

10. A core-in-shell heat exchanger comprising an outer container, a plate heat exchanger surrounded by the outer container, a supply line via which fluid can be introduced into the plate heat exchanger, and a discharge line via which fluid can be removed from the plate heat exchanger, wherein at least one transition component is arranged in the supply line and/or in the discharge line, said transition component comprising:
    a first material piece made from a first material and a second material piece made from a second material, wherein the first material and the second material cannot be connected to each other by fusion welding,
    the first material piece and the second material piece form a hollow body, and the transition component has a radially interior inner side and a radially exterior outer side,
    the first material piece is connected to the second material piece by at least one intermediate material layer, and
    the transition component has at least one insulation layer, wherein the insulation layer extends at least partially over the inner side and/or the outer side of the transition component, and wherein the first material is steel or stainless steel, and the second material is aluminum or an aluminum alloy.

11. The core-in-shell heat exchanger according to claim 10, wherein the insulation layer is arranged on the outer side of the transition component and is a sheath.

12. The core-in-shell heat exchanger according to claim 11, in which the first material piece is connected to a first piping made from the first material, and the second material piece is connected to a second piping made from the second material, wherein the sheath further covers a section of the first piping and/or a section of the second piping.

13. The core-in-shell heat exchanger according to claim 11, wherein the sheath comprises metal and/or plastic and/or ceramic and/or concrete.

14. The core-in-shell heat exchanger according to claim 11, in which the first material piece is connected to a first piping made from the first material, and the second material piece is connected to a second piping made from the second material, wherein the sheath further covers a section of the first piping and a section of the second piping.

15. The core-in-shell heat exchanger according to claim 10, wherein the insulation layer is arranged on the inner side of the transition component and is a refractory lining.

16. The core-in-shell heat exchanger according to claim 10, wherein the plate heat exchanger is formed from the second material, and the supply line and/or the discharge line has a first piping made from the first material and a second piping made from the second material, wherein the second piping is connected to the plate heat exchanger, and wherein the first piping is connected to the second piping via the at least one transition component.

17. A cold box containing at least one process engineering apparatus, wherein piping within the at least one process engineering apparatus and/or within a supply line to and/or discharge line from the cold box has at least one transition component, said transition component comprising:
a first material piece made from a first material and a second material piece made from a second material, wherein the first material and the second material cannot be connected to each other by fusion welding,
the first material piece and the second material piece form a hollow body, and the transition component has a radially interior inner side and a radially exterior outer side,
the first material piece is connected to the second material piece by at least one intermediate material layer, and
the transition component has at least one insulation layer, wherein the insulation layer extends at least partially over the inner side and/or the outer side of the transition component, and wherein the first material is steel or stainless steel, and the second material is aluminum or an aluminum alloy.

18. The cold box according to claim 17, wherein piping in the cold box has no flange connections.

19. A The cold box according to claim 17, wherein said coldbox contains at least two of said process engineering apparatus, wherein piping within at least one of the at least two process engineering apparatus and/or between at least two process engineering apparatuses and/or within a supply line to and/or a discharge line from the cold box has at least one of said transition components.

20. The cold box according to claim 19, wherein piping in the cold box has no flange connections.

21. A transition component for connecting components of a chemical or process engineering apparatus, wherein the transition component comprises:
a first material piece made from a first material and a second material piece made from a second material, wherein the first material and the second material cannot be connected to each other by fusion welding,
the first material piece and the second material piece form a hollow body, and the transition component has a radially interior inner side and a radially exterior outer side,
the first material piece is connected to the second material piece by at least one intermediate material layer, and the connection between the first material piece and the second material piece cannot be released, and
the transition component has at least one insulation layer, wherein the insulation layer extends at least partially over the inner side and/or the outer side of the transition component, and wherein the first material is steel or stainless steel, and the second material is aluminum or an aluminum alloy.

\* \* \* \* \*